United States Patent
Mueller-Weinfurtner et al.

(10) Patent No.: US 7,826,342 B2
(45) Date of Patent: Nov. 2, 2010

(54) CORRELATION METHOD FOR CHANNEL ESTIMATION FOR OFDM

(75) Inventors: Stefan Mueller-Weinfurtner, Nuremberg (DE); Peter Schramm, Eching (DE); Udo Wachsmann, Schwabach (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 784 days.

(21) Appl. No.: 10/541,790

(22) PCT Filed: Jan. 15, 2003

(86) PCT No.: PCT/IB03/00235

§ 371 (c)(1), (2), (4) Date: May 1, 2006

(87) PCT Pub. No.: WO2004/064345

PCT Pub. Date: Jul. 29, 2004

(65) Prior Publication Data

US 2006/0227904 A1    Oct. 12, 2006

(51) Int. Cl.
*H04J 11/00* (2006.01)
(52) U.S. Cl. .................. 370/208; 370/330; 370/478
(58) Field of Classification Search .......... 370/312, 370/315, 328, 330, 338, 339, 342, 437, 478
See application file for complete search history.

(56) References Cited

U.S. PATENT DOCUMENTS

| | | | | |
|---|---|---|---|---|
| 5,907,555 | A * | 5/1999 | Raith ........................ | 370/468 |
| 6,618,452 | B1 * | 9/2003 | Huber et al. ................ | 375/343 |
| 7,149,239 | B2 * | 12/2006 | Hudson ...................... | 375/144 |
| 7,149,264 | B2 * | 12/2006 | Black et al. ................ | 375/349 |
| 7,352,730 | B2 * | 4/2008 | Ghosh et al. ............... | 370/338 |
| 2006/0239367 | A1 * | 10/2006 | Wilhelmsson et al. ....... | 375/260 |

FOREIGN PATENT DOCUMENTS

EP   1401164 A1 * 3/2004

OTHER PUBLICATIONS

B, McNair et al., "A Robust Timing and Frequency Offset Estimation Scheme for Orthogonal Frequency Division Multiplexing (OFDM) Systems," IEEE 49th Vehicular Tehcnology Conference, vol. 1, pp. 690-694.*
Muneta, Satoshi et al., "A New Frequency-Domain Link Adaptation Scheme for Broadband OFDM Systems", pp. 253-257, vol. 1, (1999).
Nunes, M. et al., "Effects of Downlink Intercell Interference on MC-CDMA System", pp. 1050-1054, vol. 3 (1998).
Onizawa, T. et al., "A Simple Adaptive Channel Estimation Scheme for OFDM Systems", pp. 279-283, vol. 1 (1999).

* cited by examiner

*Primary Examiner*—Donald L Mills
(74) *Attorney, Agent, or Firm*—Browdy and Neimark, PLLC

(57) ABSTRACT

The present invention concerns a method for estimating the time-dispersion of a channel comprising D subchannels, wherein one computes from a received signal a set of estimated Channel Transfer Factors (CTF's) $\hat{H}[v]$, where $v(0 \leq v \leq D)$ is the subchannel number, said method comprising a step of calculating, for a predetermined strictly positive integer d, a correlation factor $C_d$ representing the correlations, both in amplitude and in phase, between pairs $\hat{H}[v]$ and $\hat{H}[v+d]$ of said computed CTF estimates. By an appropriate choice of d, the time-dispersion resolution can be adapted to most prevalent channels. The correlation is optionally corrected according to the mean channel estimation signal-to-noise ratio. This method can be used for many applications where knowing the time-dispersion characteristics of a channel is required, and is, for example, particularly suitable for designing a channel estimation filter, and for link adaptation. Application to devices and apparatus implementing these methods.

20 Claims, 1 Drawing Sheet

CORRELATION METHOD FOR CHANNEL ESTIMATION FOR OFDM

FIELD

The present invention concerns a method and a device for channel estimation in communications systems using Orthogonal Frequency-Division Multiplexing (OFDM).

BACKGROUND

The invention is particularly useful in the field of wireless digital communications systems. In these systems, one usually deals with multipath channels: due to reflections on obstacles, the transmitted signal reaches the receiver after having followed a plurality of paths. Hence the received signal results from the superposition of a plurality of replica of the transmitted signal, each one associated (in the equivalent complex baseband representation) with a specific delay and attenuation. This received signal is therefore equal to the convolution of the transmitted signal with a so-called Channel Impulse Response (CIR) h(t) (where t denotes time).

The CIR is non-zero only in an interval $0<t<\tau$, where $\tau$ is the so-called excess delay of the channel, viz., the maximum possible delay between the various paths. The channel is said to be time-dispersive if the shape of the CIR is different from one narrow peak. Typical values of $\tau$ range from 50 to 150 ns for in-door communications, and from 250 ns to 30 µs for mobile radio communications.

Equivalently, implementing a Fourier transform of the CIR, the time-dispersion properties of a channel may be represented in the "frequency domain" by means of a "channel transfer function" H(f); at any given frequency, the value of this function is called the "Channel Transfer Factor" (CTF).

The data symbols to be transmitted are modulated, and the receiver demodulates the corresponding received signal in order to recover those symbols. Clearly, knowledge of the CIR allows one to conduct this demodulation more accurately.

Furthermore, in many modern digital communications systems, for example telephone systems or mobile radio systems, the demodulation process is "coherent". This requires that the system provides a means for "channel estimation", viz., for computing an estimate of some channel characteristics of interest (such as the channel impulse response) using a reference portion of the received signal. For example, in so-called pilot-assisted channel estimation, one transmits a "pilot signal" based on symbols which are a priori known by the receiver. As another example, in so-called decision-directed channel estimation, the receiver uses as a reference some received symbols whose value has been determined by means of a tentative decision process.

A realistic channel always suffers from random noise, which adds up to the ideally-noiseless received signal. Therefore, if channel estimation is purely based on reference symbols, one only obtains a coarse channel estimate, so that the coherent demodulation process based on this estimate will offer sub-optimal performance. In order to improve over such coarse estimates, it is often necessary to take into account known statistical properties of the channel and/or the noise process. Channel variations over time or over frequency have typically a smaller bandwidth than the noise process, so that, for example, some known channel estimation methods use a filter in order to reduce the amount of noise afflicting the channel estimates.

The need for channel estimation arises, for example, in communications systems using Orthogonal Frequency-Division Multiplexing (OFDM).

OFDM is a multiple-channel modulation scheme. It is especially appropriate for highly frequency-selective channels such as typical channels for mobile communications, or for high-rate wireline transmission over copper lines. Such channels are characterized by impulse responses which are substantially longer than one sample interval. This means that, even in the noiseless case, each received sample in the digital baseband domain is a superposition of multiple transmitted samples weighted by the appropriate channel coefficients. In order to resolve such "intersample interference", some kind of equalization needs to be performed.

The way OFDM combats intersample interference is by dividing the total channel bandwidth into a number D of substantially smaller portions, called subchannels. One OFDM channel comprises one parallel use of all subchannels. The data to be transmitted is collected into so-called OFDM symbols, and each OFDM symbol is transmitted in parallel on a number $D_u$ ($0<D_u \leq D$) of these subchannels. The transmitted subchannel signals are orthogonal to each other. Since the duration of one OFDM symbol is much longer than the sample interval, the problem of intersymbol interference is strongly reduced.

To get totally rid of intersymbol interference, a guard interval between two symbols is usually introduced during OFDM transmission. If the length of the guard interval exceeds the length of the channel impulse response, there is no residual intersymbol interference. Furthermore, if the guard interval is used in the form of a cyclic prefix, as is usually the case for OFDM transmission, one may implement a very simple equalization of the frequency-selective channel in the frequency domain.

The Wireless Local Area Networks (WLAN) systems are examples of radio communications systems which use OFDM. ETSI (European Telecommunication Standard) BRAN (Broadband Radio Access Network) includes a short-range high-data-rate communications system called "HIPERLAN type 2" (HIPERLAN/2). HIPERLAN/2 may be used to transport Internet Protocol (IP) packets, and will also be capable to act as a wireless Asynchronous Transfer Mode (ATM) system, as well as a public access system, e.g. with an interface to the Universal Mobile Telecommunications System (UMTS). The physical layer of HIPERLAN/2 is based on OFDM, with a guard interval in the form of a cyclic prefix. Other WLAN systems based on OFDM have been standardized by ARIB in Japan (MMAC and its extensions), and by IEEE in the US (IEEE802.11a and its extensions).

In pilot-assisted channel estimation schemes for OFDM, known symbols are transmitted on given subchannels and time instants for training purposes; for example, in systems according to the HIPERLAN/2 or to the IEEE802.11a standard, there are two full OFDM pilot symbols preceding every burst of data-carrying OFDM symbols. The principle of decision-directed approaches for OFDM is quite similar: before channel estimation, some data symbols are being decided; these decided symbols are then treated in the same way as pilot symbols.

The simplest channel estimation method consists in comparing a transmitted pilot symbol with the received value in the respective subchannel. The ratio between these two quantities then yields an estimated subchannel transfer factor. This method is known as the "least-squares estimation".

It may be useful to exploit correlations inside the channel transfer function, either in the frequency or in the time domain, or both. Assuming, for simplicity, that only correlations in the frequency domain shall be exploited in the OFDM signal, the characteristics of the channel transfer function over frequency can be regarded as a "band-limited" process. Band-limited means here that the transformation of the channel transfer function into the time-domain yields a CIR of limited length, i.e. the CIR length is substantially smaller than the OFDM symbol length. This usually holds for OFDM transmission systems.

Therefore, correlations in the frequency-domain may be exploited by means of an appropriate filter. Ideally, this filter, which is called a "channel estimation filter", should be perfectly adapted to the band-limited channel frequency response. This means that the filter should be designed in such a way that the spectrum of its impulse response displays the same band-limitation as the channel frequency response. Hence, an appropriate filter design requires knowledge of the channel excess delay, which specifies said band limitation.

An example of the use of channel estimation filters to improve the quality of channel estimation can be found in the paper by V. Mignone and A. Morello titled "CD3-OFDM: A Novel Demodulation Scheme for Fixed and Mobile Receivers", *IEEE Trans. Comm.*, vol. 44, No. 9, pp. 1144-1151, September 1996. According to this scheme, which uses a decision-directed coherent demodulation, received signals are fed back after they have been corrected by means of a channel coding scheme (which needs to be fairly powerful in order to ensure stability). Two types of appropriate filters are discussed in this paper. The first one has a pre-set bandwidth which is flat in the time-domain (and is of the order of the guard interval): such a filter is therefore not matched to the actual channel excess delay as it optimally should. The second one has a bandwidth which is adaptively determined after the receiver has calculated the CIR by Fourier-transforming the CTF: but this conversion from the frequency-domain to the time-domain is computationally expensive.

Besides the purpose of channel estimation filtering, the channel correlations in the frequency-domain may also be exploited for link-adaptation purposes. "Link-adaptation" means that one or more channel-characterizing parameters are used to select an appropriate modulation and coding scheme for transmission. In particular, the degree of such correlations may serve as one such channel-characterizing parameter.

An example of this approach can be found in the paper by S. Muneta et al. titled "A New Frequency-Domain Link Adaptation Scheme for Broadband OFDM Systems", belonging to the *Proceedings of the 50th IEEE Vehicular Technology Conference (VTC 1999-Fall)*, pp. 253-257, Amsterdam, The Netherlands, September 1999. In this paper, a link-adaptation algorithm is proposed, in which two pieces of link information are used to adapt coding rate and modulation scheme of the current radio link in a HIPERLAN/2-type system. These pieces of information are two functions, the values of which depend on both the excess delay and the Signal-to-Noise Ratio (SNR) of the channel. These functions are calculated from the amplitudes of frequency-domain samples of the received preamble. But these functions are defined in a more or less heuristic fashion, and do not take into account the phase of said frequency-domain samples, so that this approach does not perform reliably.

SUMMARY

Thus, according to a first aspect, the invention concerns a method for estimating the time-dispersion of a channel comprising D subchannels, wherein one computes from a received signal a set of estimated Channel Transfer Factors (CTF's) $\hat{H}[\upsilon]$ where $\upsilon$ ($0 \leq \upsilon < D$) is the subchannel number, said method comprising a step of calculating, for a predetermined strictly positive integer d, a correlation factor $C_d$ representing the correlations, both in amplitude and in phase, between pairs $\hat{H}[\upsilon]$ and $\hat{H}[\upsilon+d]$ of said computed CTF estimates.

One should note that the CTF's involved here can be coarse CTF estimates, for example least-squares estimates, but they can of course just as well be filtered CTF estimates. Thus, the method according to the invention may be adapted to the quality or accuracy of the channel estimation actually used.

Furthermore, the value of parameter d may be adjusted as a function of the expected order of magnitude of the excess delay τ. When the excess delay is relatively large, the channel transfer function varies rapidly with frequency, and it is therefore necessary to use a small value of d (the minimum being 1) in order to keep up with these variations; the averaging over pairs of CTF estimates will then include a large number of terms. When the excess delay is relatively small, the channel transfer function varies less rapidly and one may, therefore, choose larger values of d (2, or bigger) in order to reduce complexity, and also in order to increase the quality of the estimation: indeed, since a small excess delay leads to a small amount of correlations between adjacent subchannels, choosing a bigger d allows one to obtain larger correlation values and hence to distinguish more easily between different excess delays.

Advantageously, the method according to the invention requires a small amount of computation, as can be appreciated on the basis of the two following exemplary embodiments.

In one embodiment, said correlation factor $C_d$, when normalized, is calculated according to the expression:

$$C_d \equiv \frac{2 \cdot \left| \sum_\upsilon \hat{H}*[\upsilon]\hat{H}[\upsilon+d] \right|}{\sum_\upsilon \left( |\hat{H}[\upsilon]|^2 + |\hat{H}[\upsilon+d]|^2 \right)},$$

where the sums over ν are carried over available pairs of said computed CTF estimates.

By "available pairs", we mean that pairs where both $\hat{H}[\upsilon]$ and $\hat{H}[\upsilon+d]$ have been computed in a prior channel estimation step, either with, or without using filters.

Whatever the method used to compute the estimated CTF's, they will embody a certain amount of noise. This noise has therefore an impact over the value of the denominator in the above-stated expression for $C_d$. More specifically, this denominator is proportional to the mean received power over the subchannels belonging to the above-mentioned set of available pairs. This mean received power is the sum of a useful received power and of a noise power, at least when the noise components are uncorrelated. Hence, this denominator depends on the power of the channel estimation error.

To take into account this effect of the noise, in another embodiment, said correlation factor $C_d$, when normalized, is calculated according to the expression:

$$C_d \equiv \left(1 + \frac{1}{\zeta u}\right) \frac{2 \cdot \left| \sum_\upsilon \hat{H}*[\upsilon]\hat{H}[\upsilon+d] \right|}{\sum_\upsilon \left( |\hat{H}[\upsilon]|^2 + |\hat{H}[\upsilon+d]|^2 \right)},$$

where $\zeta_u$ is the "mean channel estimation signal-to-noise ratio", and the sums over ν are carried over available pairs of said computed CTF estimates.

This mean channel estimation signal-to-noise ratio $\zeta_u$, which specifies the quality of the channel estimates, is defined as:

$$\zeta u \equiv \frac{P_H}{P_e},$$

where:

$$P_H \equiv \epsilon\{|H[\upsilon]|^2\}$$

is the mean-squared channel amplitude per subchannel, and $$P_e \equiv \epsilon\{|H[\upsilon] - \hat{H}[\upsilon]|^2\}$$

is the mean power of the effective subchannel estimation error.

The method according to the invention can be useful for many applications where knowing the time-dispersion characteristics of a channel is required, and is, for example, particularly suitable for designing a channel estimation filter, and for link adaptation.

In one such application, the method further comprises a step of looking-up in a pre-constructed mapping table a value of channel excess delay τ corresponding to the value of said correlation factor $C_d$.

This mapping table is constructed by associating each value of $C_d$ displayed in it with the corresponding value of channel excess delay measured, in one way or another, in the same physical setting as the one in which this value of $C_d$ has been calculated. Equivalently, one may use an experimentally established semi-analytic relation instead of a mapping table.

In another application, the method further comprises a step of adapting some link parameters as a function of the value of said correlation factor $C_d$. These link parameters may include for example the modulation scheme and/or the coding scheme.

According to a second aspect, the invention concerns a device for estimating the time-dispersion of a channel comprising D subchannels, said device receiving as an input a set of estimated Channel Transfer Factors (CTF's) $\hat{H}[\upsilon]$, where $\upsilon$ ($0 \leq \upsilon < D$) is the subchannel number, computed from a received signal, characterized in that it comprises a correlations unit capable of computing a correlation factor $C_d$, where d is a predetermined strictly positive integer, representing the correlations, both in amplitude and in phase, between pairs $\hat{H}[\upsilon]$ and $\hat{H}[\upsilon+d]$ of said computed CTF estimates.

In a particular embodiment, this time-dispersion estimation device also comprises a parallel-to-serial unit capable, when provided with a CTF vector $\hat{H}$ as an input, of providing said correlations unit with a series of individual CTF's $\hat{H}[\upsilon]$ classified by successive subchannel number $\upsilon$.

This device may use various appropriate expressions for said correlation factor $C_d$.

In one embodiment, said correlation factor $C_d$, when normalized, is calculated according to the expression:

$$C_d \equiv \frac{2 \cdot \left|\sum_\upsilon \hat{H}*[\upsilon]\hat{H}[\upsilon+d]\right|}{\sum_\upsilon \left(|\hat{H}[\upsilon]|^2 + |\hat{H}[\upsilon+d]|^2\right)},$$

where the sums over □ are carried over available pairs of said computed CTF estimates.

In another embodiment, where the effect of the noise is taken into account, the correlation factor $C_d$, when normalized, is calculated according to the expression:

$$C_d \equiv \left(1 + \frac{1}{\zeta u}\right) \frac{2 \cdot \left|\sum_\upsilon \hat{H}*[\upsilon]\hat{H}[\upsilon+d]\right|}{\sum_\upsilon \left(|\hat{H}[\upsilon]|^2 + |\hat{H}[\upsilon+d]|^2\right)},$$

where $\zeta_u$ is the mean channel estimation signal-to-noise ratio, and the sums over $\upsilon$ are carried over available pairs of said computed CTF estimates.

The time-dispersion device according to the invention may conveniently be applied to the estimation of the excess delay of a channel. For this purpose, this device will also comprise a look-up table, capable of providing a value of channel excess delay τ corresponding to the value of $C_d$.

The time-dispersion device according to the invention may also conveniently be applied to the estimation of link quality. For this purpose, this device will also comprise a link adapter responsive to the value of said correlation factor $C_d$.

The invention also relates to:
- a modulated-signal reception apparatus including a device as succinctly described above,
- a telecommunications network including at least one reception apparatus as succinctly described above,
- a data storage means containing computer program code instructions for executing steps of anyone method as succinctly described above, and
- a computer program containing instructions such that, when said program controls a programmable data processing device, said instructions mean that said data processing device implements anyone method as succinctly described above.

The advantages offered by these devices, apparatus, telecommunications networks, data storage means and computer programs are essentially the same as those offered by the methods according to the invention.

BRIEF DESCRIPTION OF THE DRAWINGS

Other aspects and advantages of the invention will emerge from a reading of the detailed description, which will be found below, of preferred embodiments given by way of non-limitative example. This description refers to the accompanying drawings, in which.

DETAILED DESCTRIPTION

Figure 1:
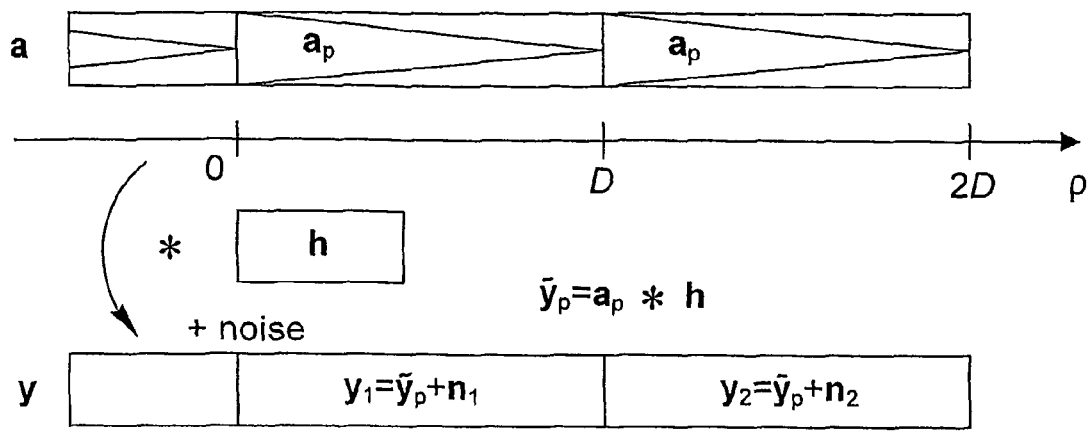
FIG. 1 is a diagram illustrating the standard time-domain structure of an OFDM preamble.

For introduction, consider the transmission of one single OFDM symbol generated with a D-dimensional Inverse Discrete Fourier Transform (IDFT). Each of the D subchannels is modulated by a complex-valued amplitude $A_\mu[\upsilon]$, where $\upsilon$ is the subchannel number ($0 \leq \upsilon < D$) representing subchannel frequency, and μ indicates the OFDM symbol number representing transmission time. The data are mapped on the subchannel amplitudes $A_\mu[\upsilon]$. The OFDM symbol is equipped with a guard interval of $D_g$ samples. The discrete-time complex baseband OFDM transmitted signal $a_\mu$ for OFDM symbol number μ, when written out as a vector over discretised time ρ, with: $-D_g \leq \rho < D$, has the following components:

$$\alpha_\mu[\rho] = \frac{1}{\sqrt{D}} \sum_{\nu=0}^{D-1} A_\mu[\nu] e^{+j\frac{2\pi}{D}\nu\rho}, \quad (1)$$

which can be generated by an IDFT of dimension D.

Using ε to denote expectation value (computed over a set of samples), the average signal power is $$\sigma_s^2 \equiv \varepsilon\{|\alpha_\mu[\rho]|^2\} = \frac{E_s}{T},$$

where $E_s$ is the average energy per channel symbol and T is the modulation interval.

For convenient notation, the symbol index μ will be suppressed in the following.

We assume transmission over a multipath channel, whose CIR will be modeled, during the transmission of each OFDM symbol, by means of a discrete-time vector h having components h[ρ] (ρ=0, ..., D−1). The fact that the continuous-time CIR is non-zero only up to the excess delay τ is equivalent to having only the components h[ρ] with ρ=0, ..., $D_e$−1 (where $D_e$ is the discretised excess delay of the CIR) being non-zero.

As discussed in the introduction, the noiseless received signal is given by $$\tilde{y} = a * h,$$

where * denotes circular convolution.

For convenient notation, without loss of generality, perfect frequency synchronization will be assumed in the receiver. At the receiver input, samples n[ρ] of Additive White Gaussian Noise (AWGN) corrupt the noiseless signal samples ỹ[p] to yield the actually-received samples $$y[\rho] = \tilde{y}[\rho] + n[\rho].$$

The noise power is $$\sigma_n^2 \equiv \varepsilon\{|n[\rho]|^2\} = \frac{N_0}{T},$$

where $N_0$ is the "one-sided power spectral density" of the white noise. The channel Signal-to-Noise Ratio (SNR) at the receiver input is thus $\zeta \equiv E_s/N_0 = \sigma_s^2/\sigma_n^2$.

Implementing a Discrete Fourier Transform (DFT), one defines the discrete Channel Transfer Factor (CTF) at subchannel 98 as $$H[\nu] \equiv \sum_{\rho=0}^{D-1} h[\rho] e^{-j\frac{2\pi}{D}\nu\rho}. \quad (2)$$

The OFDM receiver yields the noisy subchannel amplitudes via DFT processing as $$Y[\nu] = \frac{1}{\sqrt{D}} \sum_{\rho=0}^{D-1} y[\rho] e^{-j\frac{2\pi}{D}\nu\rho}$$

$$= \tilde{Y}[\nu] + N[\nu],$$

where $$\tilde{Y}[\nu] \equiv A[\nu] H[\nu] \quad (3)$$

is the noiseless received subchannel amplitude, and N[υ] is the resulting noise sample on subchannel υ. Here we assumed that the guard interval $D_g$ is sufficiently large so that the linear convolution of the transmitted OFDM signal and the CIR is equal to their circular convolution in the time interval of interest.

It is obvious from Equation (3) that for data recovery from y[υ], an estimate of H[υ] is required.

We shall now describe, as an example of a method which can be implemented in the receiver to obtain a coarse estimate of H[υ] within the framework of the present invention, the known "least-squares" estimation method.

The active subchannel positions will be referred to by the subchannel indices v which belong to a set U containing the $D_u$ indices of these positions. The remaining (D−$D_u$) subchannels, namely the ones in which the modulation amplitude is set to zero, are usually called "virtual" subchannels.

We shall assume that, for so-called training purposes, a preamble symbol containing known subchannel amplitudes covering the entire active frequency-domain is provided; we will collect these amplitudes in a vector $A_p$ of length $D_u$.

The transmitted time-domain preamble (or pilot) OFDM symbol is depicted in the upper part of FIG. 1. The repeatedly transmitted time-domain sequence of length D is obtained by the IDFT $$a_p = \frac{1}{\sqrt{D}} D_u^\dagger A_p, \quad (4)$$

where we introduced the $D_u \times D$ partial DFT matrix $$D_u = \left[ e^{-j\frac{2\pi}{D}\nu\rho} \right]_{\substack{\nu \in U \\ \rho \in [0,...,D-1]}}, \quad (5)$$

and † denotes the conjugate transpose of a matrix.

The sample sequence resulting from the convolution of the transmitted preamble sample sequence with the CIR h is disturbed by additive noise. Since the guard interval and the repeated preamble, which are assumed to be of sufficient size, are both cyclic, the linear convolution is equal to the circular convolution for these signal segments which are of interest for final demodulation. Thus, the noiseless received sequence $\tilde{y}_p$, of length D is equal to the circular convolution of $a_p$ and h.

In the lower part of FIG. 1, the temporal structure of the received signal is indicated. Perfect channel frequency synchronization has been assumed. The successive received sequences $y_1, y_2$, and so on, are made of the repeated noiseless sequence $\tilde{y}_p$ disturbed respectively by the (statistically independent) successive D-dimensional noise vectors $n_1, n_2$, and so on.

Implementing a DFT, we find:

$$\tilde{Y}_p \equiv \frac{1}{\sqrt{D}} D_u \tilde{y}_p = diag\left\{\frac{1}{\sqrt{D}} D_u a_p\right\} \cdot D_u h = diag\{A_p\} \cdot H = A \cdot H, \quad (10)$$

where we collected the $D_u$ channel transfer factors $H[\upsilon]$ ($\upsilon \in U$) in the column vector $$H \equiv D_u h, \quad (7)$$

and we collected the transmitted pilot subchannel amplitudes in the $D_u \times D_u$ diagonal matrix $$A \equiv diag\{A_p\}. \quad (8)$$

Each received sequence is of the form:

$$y_p = \tilde{y}_p + n, \quad (9)$$

where n is a noise vector.

This received signal $y_p$ is transformed into frequency domain via the DFT $$Y_p \equiv \frac{1}{\sqrt{D}} D_u y_p = A \cdot H + \frac{1}{\sqrt{D}} D_u n = A \cdot H + N, \quad (10)$$

where we used Equation (6), and we introduced the $D_u$-dimensional frequency-domain noise vector N.

Finally, the "least-squares estimate" $\hat{H}_{LS}$ of the CTF vector is obtained by dividing out the frequency-domain received signal by the pilot subchannel amplitudes:

$$\hat{H}_{LS} = A^{-1} Y_p. \quad (11)$$

This operation can be seen as extracting or removing the influence of the transmitted pilot amplitudes from the received signal.

The least-squares estimation method just described is only one possible way to obtain a coarse estimate $\hat{H}_{coarse}$ of the CTF. Furthermore, for good quality channel estimation, filtering of $\hat{H}_{coarse}$ by means of a channel estimation filter is commonly arranged in the receiver. But the present invention teaches a method which allows one to estimate the channel excess delay τ whether the measured channel transfer factors have, or have not, been filtered beforehand; whatever the case may be, these CTF estimates will be denoted as $\hat{H}[\upsilon]$ in the following.

A characteristic to quantify the amount of time-dispersion will now be derived. This characteristic exploits the close connection existing between the size of the excess delay, representing essentially the width of the CIR, and the amount of self-correlations in the channel transfer function, since the latter is the Fourier transform of the CIR (as expressed by Equation (2) above).

This auto-correlation is explored, according to the invention, by comparing, both in amplitude and in phase, the channel transfer factors corresponding to subchannels separated by a predetermined subchannel number d. The amplitude of the difference between such pairs is summed over "available pairs", viz., pairs where both $\hat{H}[\upsilon]$ and $\hat{H}[\upsilon+d]$ have been computed by some channel estimation means, and preferably over all such pairs; this sum shall be written as:

$$S[\hat{H}] \equiv \sum_{\upsilon} |\hat{H}[\upsilon+d] - e^{+j\varphi} \hat{H}[\upsilon]|^2, \quad (12)$$

where the constant φ, the so-called "phase ramp", takes into account a possible shift in the time window determining, for each OFDM symbol, the set of samples involved in the DFT (see Equation (10) above).

The phase ramp contribution to $S[\hat{H}]$ in Equation (12) is of no interest as far as channel dispersion estimation is concerned. One can get rid of this phase ramp, and hence of the dependence upon potentially different time windows, by minimizing the expression of $S[\hat{H}]$ with respect to φ:

$$\min_{\varphi} S[\hat{H}] = \min_{\varphi} \left( \begin{array}{c} \sum_{\upsilon} |\hat{H}[\upsilon+d]|^2 + \sum_{\upsilon} |\hat{H}[\upsilon]|^2 - \\ 2 \cdot \mathrm{Re}\left\{ \sum_{\upsilon} e^{-j\varphi} \hat{H}*[\upsilon] \hat{H}[\upsilon+d] \right\} \end{array} \right) \quad (13)$$

$$= \sum_{\upsilon} |\hat{H}[\upsilon+d]|^2 + \sum_{\upsilon} |\hat{H}[\upsilon]|^2 - 2 \cdot \left| \sum_{\upsilon} \hat{H}*[\upsilon] \hat{H}[\upsilon+d] \right|.$$

If the CIR exhibits a large dispersion, then the frequency response will be very selective, so that this difference power will be large. Obviously, the characteristic depends on the absolute power of the CIR. It is therefore reasonable to factor out this CIR power, to obtain:

$$\min_{\varphi} S[\hat{H}] = \left( \sum_{\upsilon} |\hat{H}[\upsilon+d]|^2 + \sum_{\upsilon} |\hat{H}[\upsilon]|^2 \right) (1 - C_d), \quad (14)$$

where we introduced a normalized correlation factor $$C_d \equiv \frac{2 \cdot \left| \sum_{\upsilon} \hat{H}*[\upsilon] \hat{H}[\upsilon+d] \right|}{\sum_{\upsilon} \left( |\hat{H}[\upsilon]|^2 + |\hat{H}[\upsilon+d]|^2 \right)}. \quad (15)$$

A value of $C_d$ near one indicates a rather non-selective CIR with small channel power dispersion, whereas smaller values of $C_d$ characterize larger dispersion.

This dispersion estimation can be improved upon by taking into account the fact that the estimated CTF's may embody a certain amount of noise. As explained above, this noise has an impact over the denominator (which plays the role of a normalization factor) in Equation (15). It is however possible to get rid of this noise effect on the normalization factor, as will be shown now.

Let us consider the most simple case of a flat channel, and of real-valued subchannel transmitted symbols, e.g. a so-called BPSK modulation. Then, the expectation value of $C_d$ is $$\varepsilon\{C_d\} = \frac{P_H}{P_H + P_e} = \frac{1}{1 + \frac{1}{\zeta u}},$$

where $P_H$, $P_e$, and $\zeta_u$ have been defined in the introduction above. Since in the case of a flat channel, one expects a correlation factor equal to 1, it appears that one should use, in this case and hence in general, $$C_d \equiv \left(1 + \frac{1}{\zeta u}\right) \frac{2 \cdot \left|\sum \hat{H}^*[v]\hat{H}[v+d]\right|}{\sum \left(|\hat{H}[v]|^2 + |\hat{H}[v+d]|^2\right)} \quad (16)$$

as a noise-corrected normalized correlation factor.

One should note that, in the above derivation, the subchannel estimation errors $\{|H[v] - \hat{H}[v]|\}$ were assumed to be uncorrelated. Therefore, the mean channel estimation signal-to-noise ratio $\zeta_u$ must be evaluated before any frequency-domain filtering, since such filtering produces correlated noise.

For example, in the case the estimation is carried out by means of the least-squares estimation method as described above, the mean channel estimation signal-to-noise ratio is equal to:

$$\zeta_u \equiv (D/D_u)\zeta.$$

This expression reflects the fact that the signal power is concentrated in the active subchannels.

On the other hand, time-domain filtering (for example implemented by averaging over two successive preamble sequences $y_1$ and $y_2$ in the time-domain) does not cause any frequency-domain noise correlation. When one uses such a filtering, it should be taken into account when evaluating $\zeta_u$. One gets in this case:

$$\zeta_u \equiv 2(D/D_u)\zeta,$$

where the factor of 2 reflects the noise reduction obtained thanks to the averaging process.

Figure 2:
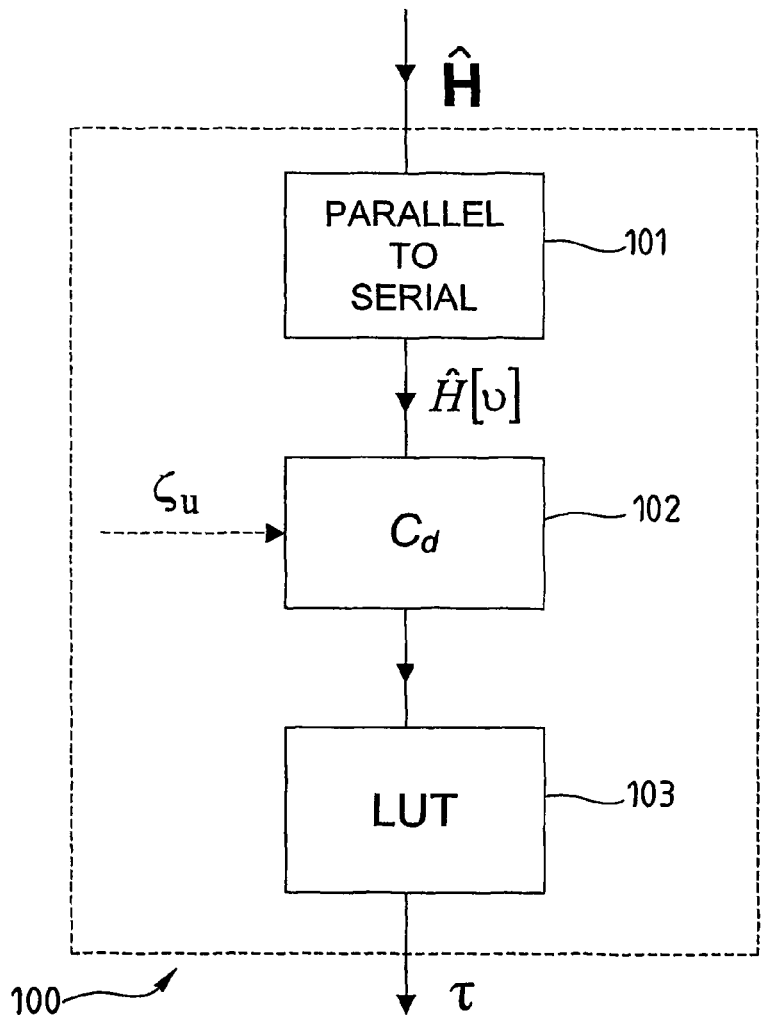
FIG. 2 depicts schematically a time-dispersion estimation device according to the invention.

FIG. 2 depicts schematically an exemplary time-dispersion estimation device 100 according to the invention.

The input to this device 100 is a set of CTF's which have been computed from the received signal, possibly collected in the form of a CTF vector $\hat{H}$. This set is processed by a parallel-to-serial unit 101, whose output consists of the series of individual CTF's (the components of $\hat{H}$) classified by successive subchannel number.

Next, correlations unit 102 computes the correlation factor $C_d$ according to Equation (15). Optionally, the correlation factor $C_d$ may be computed according to Equation (16), in which case the value of the mean channel estimation signal-to-noise ratio $\zeta_u$ is also provided to correlations unit 102. This unit comprises delay registers adjusted to the value chosen for the integer parameter d, so as to be able to associate in the calculation pairs of CTF's whose subchannel numbers differ by d.

Finally, correlations unit 102 transmits the calculated value of the correlation factor $C_d$ to a Look-Up Table (LUT) 103, in which the value of excess delay τ corresponding to this value of $C_d$ is read or interpolated, before being sent to the output of the time-dispersion estimation device 100.

As a variant, look-up table 103 may be replaced by a calculation unit capable of calculating τ when given $C_d$ by means of some experimentally established semi-analytic relation.

The invention claimed is:

1. A method for estimating the time-dispersion of a channel in a communications system, the channel comprising D subchannels, comprising:
   computing, from a signal received over the channel in a receiver, a set of estimated Channel Transfer Factors (CTF's) $\hat{H}[v]$, where $v(0 \leq v < D)$ is the subchannel number,
   calculating, for a predetermined strictly positive integer d, a correlation factor $C_d$ representing the correlations, both in amplitude and in phase, between pairs $\hat{H}[v]$ and $\hat{H}[v+d]$ of said computed CTF estimates, and
   estimating, in said receiver, the time-dispersion of said channel using the calculated correlation factor $C_d$.

2. A time-dispersion estimation method according to claim 1, wherein a normalized expression for said correlation factor $C_d$ is:

$$C_d \equiv \frac{2 \cdot \left|\sum_v \hat{H}^*[v]\hat{H}[v+d]\right|}{\sum_v \left(|\hat{H}[v]|^2 + |\hat{H}[v+d]|^2\right)},$$

where the sums over v are carried over available pairs of said computed CTF estimates.

3. A time-dispersion estimation method according to claim 1, wherein a normalized expression for said correlation factor $C_d$ is:

$$C_d \equiv \left(1 + \frac{1}{\zeta_u}\right) \frac{2 \cdot \left|\sum_v \hat{H}^*[v]\hat{H}[v+d]\right|}{\sum_v \left(|\hat{H}[v]|^2 + |\hat{H}[v+d]|^2\right)},$$

where $\zeta_u$ is the mean channel estimation signal-to-noise ratio, and the sums over v are carried over available pairs of said computed CTF estimates.

4. A time-dispersion estimation method according to claim 1, further comprising a step of looking-up in a pre-constructed mapping table a value of channel excess delay τ corresponding to the value of said correlation factor $C_d$.

5. A time-dispersion estimation method according to claim 1, further comprising a step of adapting some link parameters as a function of the value of said correlation factor $C_d$.

6. A device (100) for estimating the time-dispersion of a channel in a communications system, the channel comprising D subchannels, the device comprising:
   a receiver configured to compute, from a signal received over the channel, a set of estimated Channel Transfer Factors (CTF's) $\hat{H}[v]$, where $v(0 \leq v < D)$ is the subchannel number,
   a correlation unit configured to compute, for a predetermined strictly positive integer d, a correlation factor $C_d$ representing the correlations, both in amplitude and in phase, between pairs $\hat{H}[v]$ and $\hat{H}[v+d]$ of said computed CTF estimates, and
   a unit configured to estimate the time dispersion of said channel using the calculated correlation factor $C_d$.

7. A time-dispersion estimation device according to claim 6, further comprising a parallel-to-serial unit (101) capable, when provided with a CTF vector $\hat{H}$ as an input, of providing said correlations unit (102) with a series of individual CTF's $\hat{H}[v]$ classified by successive subchannel number $v$.

8. A time-dispersion estimation device according to claim 6, wherein a normalized expression for said correlation factor $C_d$ is:

$$C_d \equiv \frac{2 \cdot \left| \sum_v \hat{H}^*[v]\hat{H}[v+d] \right|}{\sum_v \left( |\hat{H}[v]|^2 + |\hat{H}[v+d]|^2 \right)},$$

where the sums over $v$ are carried over available pairs of said computed CTF estimates.

9. A time-dispersion estimation device according to claim 6, wherein a normalized expression for said correlation factor $C_d$ is:

$$C_d \equiv \left(1 + \frac{1}{\zeta_u}\right) \frac{2 \cdot \left| \sum_v \hat{H}^*[v]\hat{H}[v+d] \right|}{\sum_v \left( |\hat{H}[v]|^2 + |\hat{H}[v+d]|^2 \right)},$$

where $\zeta_u$ is the mean channel estimation signal-to-noise ratio, and the sums over $v$ are carried over available pairs of said computed CTF estimates.

10. A time-dispersion estimation device according to claim 6, further comprising a look-up table (103), capable of providing a value of channel excess delay $\tau$ corresponding to the value of $C_d$.

11. A time-dispersion estimation device according to claim 6, further comprising a link adapter responsive to the value of said correlation factor $C_d$.

12. A modulated-signal reception apparatus, comprising a device according to claim 6.

13. A telecommunications network, comprising at least one reception apparatus according to claim 12.

14. A data storage device, comprising a non-transitory computer readable storage medium storing computer program code instructions for executing steps of the method according to claim 1.

15. A data storage means according to claim 14, wherein the data storage device is partially or totally removable.

16. A computer program stored on a non-transitory computer readable storage medium, comprising computer program code instructions such that, when said program is executed to control a programmable data processing device, said instructions cause said data processing device to implement a method according to claim 1.

17. A time-dispersion estimation device according to claim 7, wherein a normalized expression for said correlation for factor $C_d$, $$C_d \equiv \frac{2 \cdot \left| \sum_v \hat{H}^*[v]\hat{H}[v+d] \right|}{\sum_v \left( |\hat{H}[v]|^2 + |\hat{H}[v+d]|^2 \right)},$$

where the sums over $v$ are carried over available pairs of said computed CTF estimates.

18. A time-dispersion estimation device according to claim 7, wherein a normalized expression for said correlation for factor $C_d$ is:

$$C_d \equiv \frac{2 \cdot \left| \sum_v \hat{H}^*[v]\hat{H}[v+d] \right|}{\sum_v \left( |\hat{H}[v]|^2 + |\hat{H}[v+d]|^2 \right)},$$

where $\zeta_u$ is the mean channel estimation signal-to-noise ratio, and the sums over $v$ are carried over available pairs of said computed CTF estimates.

19. A time-dispersion estimation device according to claim 7, further comprising a look-up table (103), capable of providing a value of channel excess delay $\tau$ corresponding to the value of $C_d$.

20. A time-dispersion estimation device according to claim 7, further comprising a link adapter responsive to the value of said correlation factor $C_d$.

* * * * *